United States Patent [19]

Wilson

[11] 3,896,275

[45] July 22, 1975

[54] TELEPHONE LINE SWITCH

[75] Inventor: James Wilson, Fair Haven, N.J.

[73] Assignee: Bell Telephone Laboratories, Incorporated, Murray Hill, N.J.

[22] Filed: Aug. 22, 1974

[21] Appl. No.: 499,763

[52] U.S. Cl. .............. 179/158 R; 179/167; 200/5 A

[51] Int. Cl.$^2$ .......................................... H04M 1/02

[58] Field of Search ............................ 179/167, 158

[56] References Cited

UNITED STATES PATENTS

| | | | |
|---|---|---|---|
| 3,396,244 | 8/1968 | Kowaleski | 179/167 |
| 3,489,860 | 1/1970 | Greenman et al. | 179/167 |

*Primary Examiner*—William C. Cooper
*Attorney, Agent, or Firm*—A. D. Hooper

[57] ABSTRACT

A line switch includes a contact pile-up, two operating buttons designated ON/FLASH and OFF, interlocking levers controlled by the operating buttons, and a magnetic latch for latching the OFF button in a designated position. When the OFF button is depressed it is latched in place by the magnetic latch to turn off the set. Depression of the ON/FLASH button also causes depression of the OFF button but simultaneously moves the magnetic latch to prevent latching of the OFF button or to release the OFF button if it was previously latched. The switch can be mounted in the base or in the handset of a telephone set and can be operated to turn the handset off and on and to flash without returning the handset to the base cradle.

7 Claims, 6 Drawing Figures

TELEPHONE LINE SWITCH

BACKGROUND OF THE INVENTION

1. Field of the Invention

This invention relates to line switches for telephones.

2. Description of the Prior Art

Most existing telephone sets include a line switch or switch hook in the base thereof by which the set is connected and disconnected from the telephone lines and by which flashing and the like are accomplished. However, such line switches do not allow the telephone to be disconnected from the line or placed "on hook" for extended periods without replacing the handset in the cradle on the base because the line switch is operated by the weight of the handset. In some existing telephone sets, an alternate action switch hook or recall switch has been incorporated into the handset itself in series with the base switch hook whereby the set can be connected and disconnected without returning the handset to the base. Such an arrangement is shown in U.S. Pat. No. 3,396,244 issued to C. Kowaleski on Aug. 6, 1968 and assigned to the assignee of this application. However, such serially connected alternate action or recall switches have disadvantages including the necessity of using two separate switches thereby adding to the cost of the telephone set, the inability to flash through the use of some of these recall switches thereby requiring a return to the base switch hook for this function, and the relative complexity of such recall switches.

Accordingly, it is an object of this invention to improve line switches for telephone.

Another object is to provide a line switch which allows connection, disconnection and flashing of the set without return of the handset to the base cradle of the set and without the use of multiple, serially connected switches.

Another object is to provide a line switch which can be utilized in a handset of a telephone set without the necessity for a serially connected switch hook in the associated base.

SUMMARY OF THE INVENTION

The foregoing objects and others are achieved in accordance with this invention by a line switch for a telephone set including a contact pile-up, two operating buttons designated ON/FLASH and OFF, interlocking springloaded levers controlled by the operating buttons, and a magnetic latch for the OFF button. When the OFF button is depressed or operated, it is latched in an off position by the magnetic latch to turn the telephone set off. Depression or operation of the ON/FLASH button releases the magnetic latch and thereby releases the OFF button to turn on the set. Operation of the ON/FLASH button without the OFF button being previously latched also operates the OFF button but prevents latching thereof so that flashing can be performed. The line switch can be mounted in either the base or the handset of the telephone set and provides for connection, disconnection and flashing without the handset being returned to the base cradle.

BRIEF DESCRIPTION OF THE DRAWING

The invention will be more fully comprehended from the following detailed description and accompanying drawing in which.

DETAILED DESCRIPTION

Figure 1:
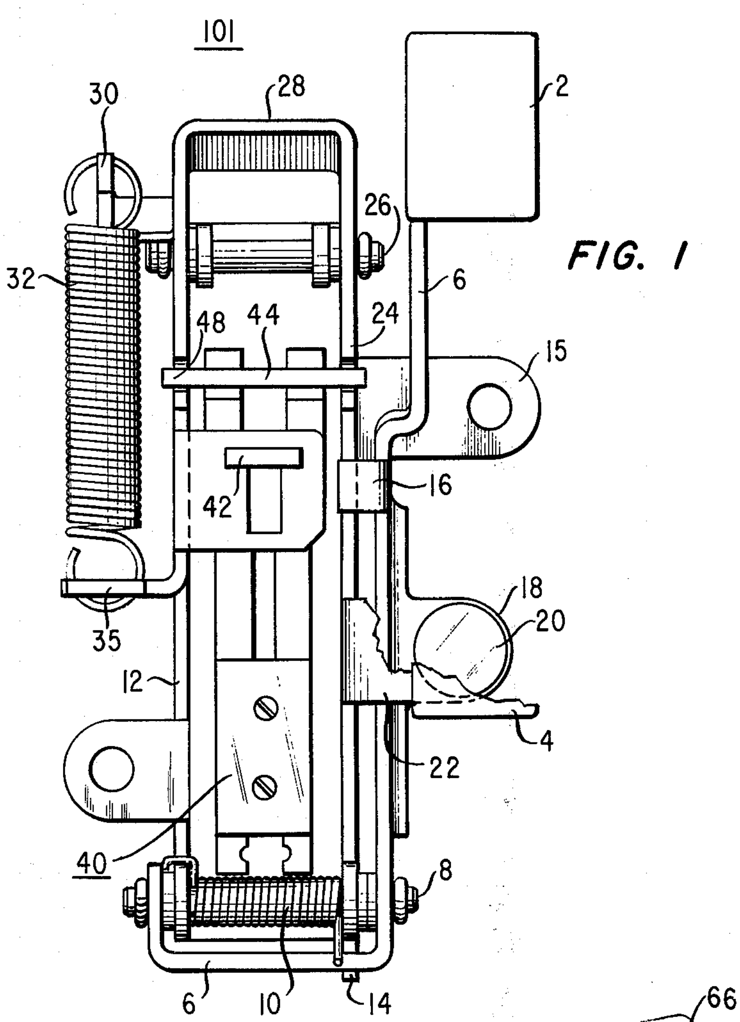
FIG. 1 is a plan view of a telephone line switch in accordance with this invention.
Figure 2:
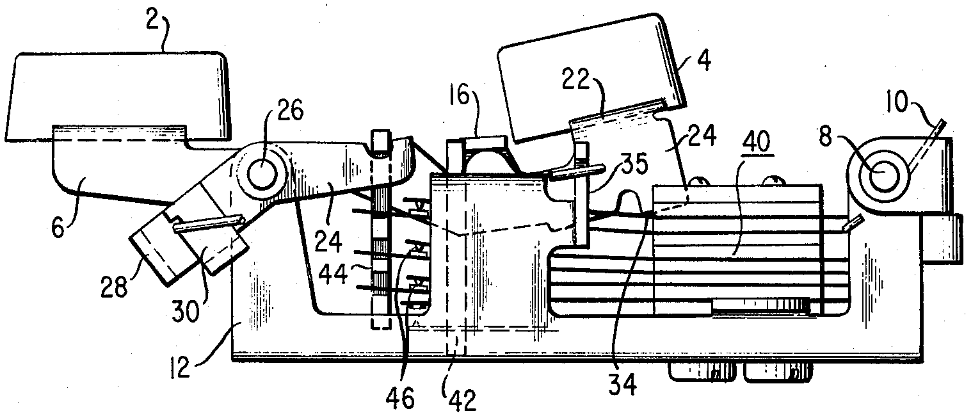
FIG. 2 is an elevation view of the line switch as viewed from the left side of FIG. 1.

Referring now to FIG. 1 there is shown a line switch 101 including first and second operating buttons 2 and 4 designated as ON/FLASH and OFF, respectively. Operating button 2 is mounted on one end of a lever or bracket 6 which is pivotably mounted at its other end on a pin or shaft 8 which is supported by a mounting bracket 12. A torsion spring 10 about shaft 8 biases lever 6 to raise button 2 upward, i.e., biases lever 6 to rotate clockwise as viewed in FIG. 2. A tab 14 on the rear of mounting or support bracket 12 limits the clockwise rotation of lever 6 and thereby the upward movement of button 2. Likewise a tab 15 on bracket 12 limits the counterclockwise rotation and thereby the downward movement of button 2.

Along the length thereof bracket or lever 6 includes a first tab 16 extending inward from the top edge thereof and a second tab 18 extending outward from the lower edge thereof. Tab 18 includes a magnet 20 mounted thereon by well known hardware such as a screw for reasons to be discussed subsequently.

Operating button 4 is mounted on an arm or tab 22 on one end of a lever or bracket 24 which is pivotably mounted on its other end on a pin or shaft 26 supported by mounting bracket 12. Thus levers 6 and 24 are pivotally mounted on opposite ends of bracket 12. The end 28 of lever 24 depends downwardly and has an arm 30 extending therefrom below shaft 26. A tension spring 32 is mounted between arm 30 and a tab 34 on mounting bracket 12. Spring 32 biases lever 24 to rotate button 4 upwardly, i.e., biases lever 24 to rotate counterclockwise as viewed in FIG. 2. The upward movement of button 4 by the counterclockwise rotation of lever 24 is limited by tab 16 on lever 6 contacting lever 24. Likewise the downward movement of button 4 is limited by a tab or flange 34 on lever 24 bottoming on or engaging bracket 12.

A contact pile-up 40 or plurality of spring contacts such as commonly used in telephone sets is mounted on bracket 12. Pile-up 40 includes a stationary card 42 which provide the proper spacing of contacts 46 with respect to each other and bracket 12. An operating card 44 which has shoulders 48 engaging lever 24 opens and closes contacts 46 by moving up and down in response to the movement of lever 24 moving card 44. Contacts 46 are connected to the telephone lines as well known in the art. Accordingly, the opening and closing of these contacts 46 can be used to connect and disconnect a telephone set with the line.

Arm 22 on which button 4 is mounted comprises a ferromagnetic material which can be attracted by magnet 20. Arm 22 can comprise an integral part of a lever 24 formed of such material or alternatively can comprise a plate of such material mounted on a non-ferromagnetic lever. Alternatively, the positions of the magnetic and ferromagnetic materials can be reversed.

Figure 3:
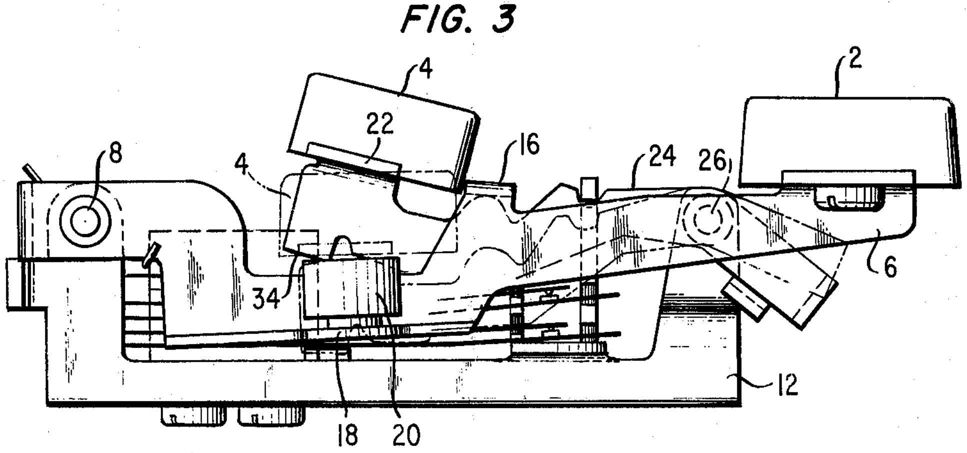
FIG. 3 is an elevation view of the line switch as viewed from the right side of FIG. 1 and showing a second position of the switch in phantom.
Figure 4:
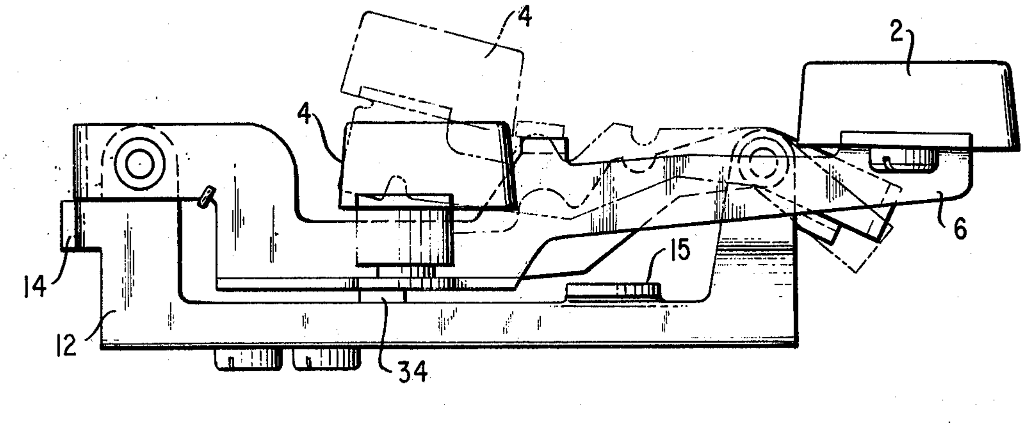
FIG. 4 is an elevation view similar to FIG. 3 illustrating still other positions of the switch.

The operation of switch 101 will now be explained with reference to FIGS. 3 and 4. In FIG. 3 both operating buttons 2 and 4 are shown in the fully up position which would activate the telephone set by connecting it to the line. Depression of OFF button 4 as indicated in phantom brings arm 22 downward into close proximity to latching magnet 20 so that the attractive magnetic force between magnet 20 and arm 22 is sufficient to overcome the bias force of spring 32 in the opposite direction. Accordingly OFF button 4 is latched in the down or off position and thereby the telephone set is turned off or disconnected from the line by card 44 opening appropriate contacts 46. No weight such as that of a handset is required to maintain the off position.

When it is desired to turn on or activate the set, i.e., to release OFF button 4, the ON/FLASH button 2 is depressed. This depression of button 2 rotates lever 6 about shaft 8 and thereby causes tab 18 on lever 6 to move downward carrying magnet 20 which is mounted thereon along with it. Magnet 20 draws arm 22 and thereby button 4 downward because of the magnetic force therebetween until tab 34 on lever 24 bottoms on mounting bracket 12 as shown in FIG. 4 to prevent further downward movement of button 4. Continued downward movement of button 2 then draws tab 18 and magnet 20 mounted thereon away from arm 22 until the magnetic force therebetween is overcome by the force of spring 32. When this happens button 4 is released from its latched off position and springs upward. Tab 16 on lever 6 contacts lever 24 to prevent button 4 from springing to its fully raised position until button 2 is released to allow lever 6 to rise. However, button 4 will not become latched again until it is again depressed as previously discussed. Thus when ON/FLASH button 2 is released the set is activated or turned on.

Flashing is accomplished in the conventional manner by rapid depression and release of ON/FLASH button 2. If button 2 is depressed when button 4 is not latched in its depressed or off position, tab 16 on lever 6 contacts lever 24 and thus depresses button 4 as button 2 is depressed. However, magnet 20 is simultaneously moved downward by the depression of button 2 and thus arm 22 and magnet 20 never come into latching proximity with respect to each other. The depression of button 4 by tab 16 causes momentary disconnection of the set until button 2 is released thereby allowing button 4 to return to its fully up position. Accordingly, the rapid depression and release of button 2 rapidly deactivates and activates the set to produce the flashing signal.

Figure 5:
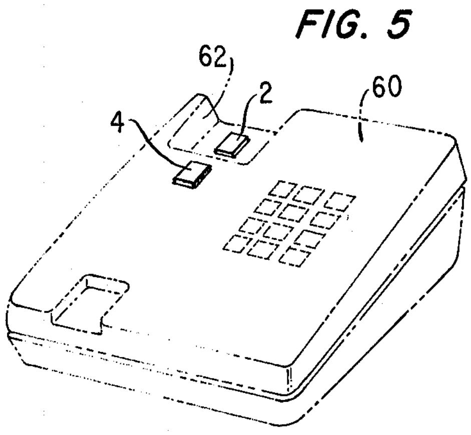
FIG. 5 illustrates the line switch incorporated into the base of a telephone set.

Switch 101 can be incorporated in the base 60 of a telephone set as indicated in FIG. 5. In this application switch 101 is operated either by the replacement of a handset in the cradle 62 of base 60 or by manual operation of buttons 2 and 4 as previously discussed without the necessity of a handset ever being replaced on base 60.

Figure 6:
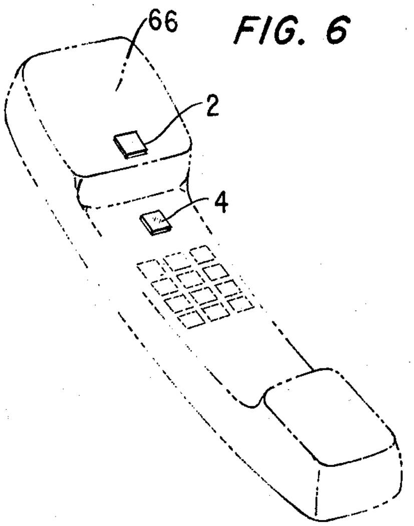
FIG. 6 illustrates the line switch incorporated into the handset of a telephone set.

Alternatively, switch 101 can be incorporated into the handset 66 of a telephone set as illustrated in FIG. 6. This would be especially advantageous for handsets including a dial therein as indicated. In this application, switch 101 is operated manually at handset 66 without ever having to return the handset to a base. Further there is no necessity for a serially connected switch hook located in the base associated with such a handset. Operating buttons 2 and 4 are located on handset 66 so that they would be operated by replacement of the handset on the base.

While the invention has been described with reference to a specific embodiment thereof it is to be understood that various modifications might be made thereto without departing from its spirit and scope.

What is claimed is:

1. A telephone line switch comprising contacts for effecting a connection with a telephone line when said contacts are in a closed position and opening said connection when said contacts are in an open position, and operating card means for moving said contacts between said closed and open positions characterized in that said line switch includes:

first means including a first pushbutton for operating said card means to move said contacts between said closed and open positions when said first pushbutton is moved from first to second positions, respectively, and conversely;

a magnetic latching means for latching said first pushbutton in said second position to hold said contacts in said open position;

second means including a second pushbutton operable between first and second positions for releasing said magnetic latching means if said first pushbutton is latched in said second position when said second pushbutton is operated from said first position to said second position and for moving said first pushbutton into said second position without engaging said magnetic latch if said first pushbutton is in said first position when said second pushbutton is operated from said first position to said second position; and means for biasing said first and second pushbuttons toward respective said first positions.

2. Apparatus in accordance with claim 1 wherein said switch comprises a mounting bracket in which said contacts are mounted and said first means comprises:

a first lever having a first end pivotably mounted to a first end of said mounting bracket and having said first pushbutton mounted on the other end of said first lever so that said first lever is rotated in response to movement of said first pushbutton between said first and second positions, said first lever including a depending tab thereon adapted to engage said mounting bracket to prevent movement of said first pushbutton past said second position; and said operating card means is mounted on said first lever for movement therewith to move said contacts.

3. Apparatus in accordance with claim 2 wherein said second means comprises:

a second lever having a first end pivotably mounted on a second end of said mounting bracket and having said second pushbutton mounted on the other end thereof so that said second lever is rotated when said second pushbutton is operated, said second lever having a first tab extending therefrom adapted for engaging said first lever to cause rotation thereof when said second lever is rotated whereby said first pushbutton can be moved from said first position to said second position when said second pushbutton is operated.

4. Apparatus in accordance with claim 3 wherein said magnetic latching means comprises a permanent magnet mounted on said second lever and a piece of ferromagnetic material on said first lever adjacent said first pushbutton for engaging said magnet when said first pushbutton is placed in said second position, said magnet being mounted for movement away from said piece of ferromagnetic material when said second pushbutton is operated to rotate said second lever whereby said magnetic latch is released.

5. Apparatus in accordance with claim 4 wherein said biasing means comprises springs applying forces to said first and second levers which tend to rotate said first and second levers to place said first and second pushbuttons in respective said first positions.

6. A telephone set having a base with a line switch in said base comprising contacts for effecting a connection with a telephone line when said contacts are in a closed position and opening said connection when said contacts are in an open position, and operating card means for moving said contacts between said closed and open positions characterized in that said line switch includes:

first means including a first pushbutton for operating said card means to move said contacts between said closed and open positions when said first pushbutton is moved from first to second positions, respectively, and conversely;

a magnetic latching means for latching said first pushbutton in said second position to hold said contacts in said open position;

second means including a second pushbutton operable between first and second positions for releasing said magnetic latching means if said first pushbutton is latched in said second position when said second pushbutton is operated from said first to said second position and for moving said first pushbutton into said second position without engaging said magnetic latch if said first pushbutton is in said first position when said second pushbutton is operated from said first to said second position; and means for biasing said first and second pushbuttons toward respective said first position.

7. A telephone set including a handset having a line switch therein comprising contacts for effecting a connection with a telephone line when said contacts are in a closed position and opening said connection when said contacts are in an open position, and operating card means for moving said contacts between said closed and open positions characterized in that said line switch includes:

first means including a first pushbutton for operating said card means to move said contacts between said closed and open positions when said first pushbutton is moved from first to second positions, respectively, and conversely;

a magnetic latching means for latching said first pushbutton in said second position to hold said contacts in said open position;

second means including a second pushbutton operable between first and second positions for releasing said magnetic latching means if said first pushbutton is latched in said second position when said second pushbutton is operated from said first to said second position and for moving said first pushbutton into said second position without engaging said magnetic latch if said first pushbutton is in said first position when said second pushbutton is operated from said first to said second position; and means for biasing said first and second pushbuttons toward respective said first position.

* * * * *